United States Patent [19]

Bukoschek et al.

[11] Patent Number: 4,827,204

[45] Date of Patent: May 2, 1989

[54] SYNCHRONOUS MOTOR WITH DYNAMIC DAMPING

[75] Inventors: Romuald L. Bukoschek, Klagenfurt, Austria; Hugo Schemmann, Schaesberg, Netherlands

[73] Assignee: U.S. Philips Corporation, New York, N.Y.

[21] Appl. No.: 669,278

[22] Filed: Nov. 7, 1984

[30] Foreign Application Priority Data

Nov. 14, 1983 [AT] Austria ................. 4007/83

[51] Int. Cl.$^4$ ................. H02P 7/04; G05B 5/01
[52] U.S. Cl. ................. 318/702; 318/372; 318/703; 310/93
[58] Field of Search ........ 318/623, 372, 304, 702, 318/703, 612, 614, 159, 160, 765, 611, 615, 159; 310/94, 121, 123, 76, 77, 93

[56] References Cited

U.S. PATENT DOCUMENTS

| | | | |
|---|---|---|---|
| 3,379,907 | 4/1968 | Hollinger | 310/77 |
| 3,562,565 | 2/1971 | Higashino | 310/77 |
| 3,579,066 | 5/1971 | Bearfield | 310/77 X |
| 3,668,445 | 6/1972 | Grove | 310/77 |
| 3,732,447 | 5/1973 | Perhats | 310/77 X |
| 3,790,831 | 2/1974 | Morreale | 310/74 |
| 4,049,985 | 9/1977 | Sudler | 310/74 X |
| 4,228,385 | 10/1980 | Angerbach | 318/611 X |
| 4,381,048 | 4/1983 | Haverkamp | 310/77 X |

FOREIGN PATENT DOCUMENTS

| | | | |
|---|---|---|---|
| 1613141 | 4/1970 | Fed. Rep. of Germany | 310/77 |
| 2261163 | 6/1975 | Fed. Rep. of Germany | 310/77 |
| 0078347 | 5/1982 | Japan | 310/77 |

Primary Examiner—Bentsu Ro
Attorney, Agent, or Firm—Brian J. Wieghaus; David R. Treacy

[57] ABSTRACT

In an electric motor with a damping device incorporating a disc-shaped damping mass which is freely rotatable and axially movable in relation to the driven element and consists at least partially of a mangetizable material, the damping mass is located within the range of a stray magnetic field (31) of the motor (11) and is pressed against a friction plate (28) located between the rotor (14) of the motor and the damping mass and rotating with the driven element as a result of the magnetic force of the stray field acting upon the mass.

8 Claims, 2 Drawing Sheets

SYNCHRONOUS MOTOR WITH DYNAMIC DAMPING

BACKGROUND OF THE INVENTION

The invention relates to an electric motor with a damping device incorporating a disc-shaped damping mass, consisting at least partly of a magnetisable material, which is axially movable and freely rotatable in relation to the driven element; and more particularly to a synchronous motor in which the mass is pressed as a result of a magnetic force against a friction plate rotating with the driven element.

An electric motor of this kind with a damping device, which is used in a known fashion to improve the starting behavior or to stabilise the running of a motor is known from U.S. Pat. No. 3,790,831, the magnetic force which presses the damping mass against a friction plate rotating with the driven gearwheel is provided by a permanent magnet incorporated in the damping mass. Providing a permanent magnet of this kind is, however, relatively expensive. A method is also known, for example from U.S. Pat. No. 3,197,659, for pressing the damping mass against a friction plate rotating with the driven element by means of an incorporated spring, but this also involves additional cost in connection with the assembly of the device as a whole.

SUMMARY OF THE INVENTION

The aim of the invention is to offer in its entirety a particularly simple design for an electric motor with a damping device.

In accordance with the invention the damping mass shall be located within range of a stray magnetic field and the friction plate situated between the rotor of the motor and the damping mass, the magnetic force acting on the damping mass being formed by a stray magnetic field of the motor. This obviates the need for a permanent magnet to apply the magnetic force which presses the damping mass against a friction plate rotating with the driven element, since that magnetic force is formed directly by a stray magnetic field of the motor. In this way use is made of a magnetic stray field of the motor for a special application.

It should be stated in this connection that other possible uses for a stray magnetic field of a motor are known but they are irrelevant to the application with which we are concerned here for example, U.S. Pat. No. 3,280,352 proposes a combined clutch plate and brake disc which, upon the electrical excitation of the motor, is adjustable by a stray magnetic field of the motor, and German Offenlegungsschrift No. 2,362,611 proposes the formation of a frictional coupling between the rotor and the driven element of a motor, in which the coupling force is provided by the stray magnetic field of the rotor which is designed as a permanent magnet.

It has proved to be an advantage if the damping mass is located within the range of the stray magnetic field of the electrical excitation of the motor. Since the stray magnetic field of the electrical excitation of the motor is still effective some distsance away from the motor, thre are no essential constructional limitations with regard to the arrangement of the damping mass and the friction plate or the driven element.

It has also proved to be advantageous if in a motor with a permanent magnet rotor the damping mass is located within the range of the stray magnetic field of the rotor. This makes it possible, as is often desirable, to achieve a highly space-saving lay-out since the damping mass can be located close to the rotor.

In this connection it has proved highly advantageous if, with a cylindrically shaped motor rotor, the friction plate is formed by a side surface of the rotor. A particularly space-saving arrangement is obtained in this manner.

It has also proved advantageous for the damping mass to be formed by two discs alongside each other, of which the first, adjacent to the friction plate, consists of non-magnetisable material and the other, second disc of magnetisable material. This means that the two discs can be dimensioned more or less irrespectively of one another, in which case only the second disc delivers the force used to press the damping mass against the fraction plate. For example, the first disc may then be made of brass and the second of iron. Since brass is higher density than iron, the damping mass can be dimensioned particularly favorably.

It has proved particularly advantageous in this connection for the second disc to take the form of a disc which is at least a factor of 10 thinner than the first disc which predominantly constitutes the damping mass. In that case the actual damping mass is practically determined only by the first disc.

It has likewise proved advantageous for the second disc not to be connected with the driven element. This means that it does not give rise to frictional losses against the driven element and is used only to press the first disc against the friction plate which rotates with the driven element. To that end the second disc may, for example, be positioned on a cylindrical step on the first disc or attached to the first disc with adhesive.

If desired, a disc with predetermined anti-friction properties can also be inserted between the friction plate and the damping mass so as to be able to influence the frictional relations between the damping mass and the friction plate in the manner indicated in U.S. Pat. No. 3,790,831 referred to in the introductory paragraph. It has also proved extremely advantageous in this connection to apply a lubricant to the facing side surfaces of the friction plate and the damping mass. This makes it possible to exercise an influence on the frictional relations between the damping mass and the friction plate such that slipping of the damping mass is favourably influenced without the need to provide an additional disc. The lubricants which may be used for this purpose comprise most compositions in the form of commercially available greases and oils.

The invention will be further explained with the aid of the drawing, in which two examples of embodiment of the invention are shown, to which, however, it must not be considered to be limited.

DESCRIPTION OF THE PREFERRED EMBODIMENTS

Figure 1:
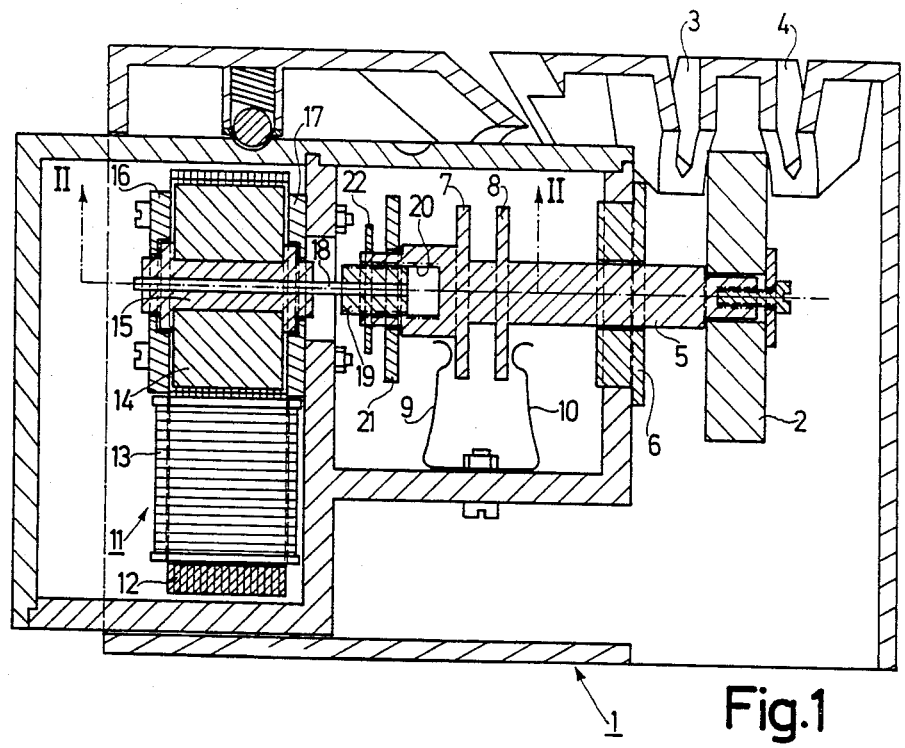
FIG. 1 is a section through a grinding machine in which a damping mass is located within the range of the stray magnetic field of the electrical excitation of the motor of the device.
Figure 2:
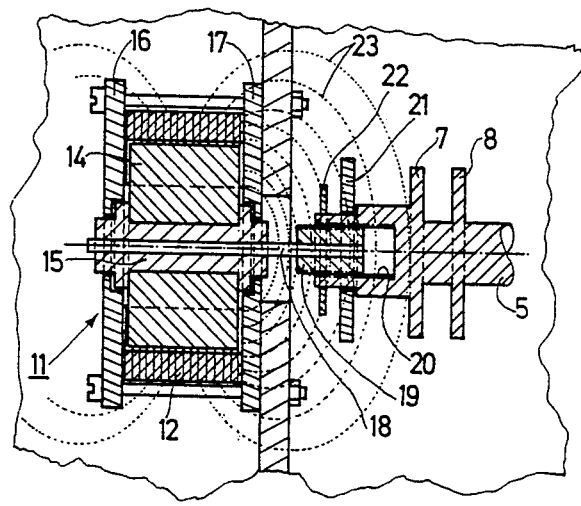
FIG. 2 is a section along line II—II in FIG. 1, in which the course of the lines of force of the stray magnetic field of the electrical excitation of the motor is indicated.

The grinding machine shown in FIGS. 1 and 2, with which, for example, knives or scissors can be sharpened, shows inside its housing 1 a grinding wheel 2, the objects to be sharpened being inserted in a slot 3 or 4 made in the housing and thus pressed against one side surface of the grinding wheel. Grinding wheel 2 is mounted on a shaft 5 which can rotate and is axially movable in a bearing 6 located at the apparatus side. Fitted on the shaft 5 are two collars or flanges 7 and 8, each of which interacts with a section, 9 and 10, respectively, of a leaf spring, these spring sections acting in opposition to each other. In this way it is possible for grinding wheel 2 together with shaft 5 to yield under lateral grinding pressure from either of the two spring sections 9 and 10, so that limitation of the contact pressure of an object to be sharpened against the grinding wheel is obtained.

To drive grinding wheel 2 the machine has an electric motor 11, which is constituted here by a self-starting single-phase synchronous motor. Motors of this kind are frequently used to drive small domestic appliances. This motor has a U-shaped stator 12, each of whose limbs carries an exciting winding 13. The free ends of the two stator limbs enclose a rotor 14 formed by a diametrically magnetized permanent magnet, fitted on a support 15, which can rotate in bearing shields 16 and 17 and from which a motor shaft 18 projects. The shaft 18 in turn carries a pinion 19 which engages in a correspondingly internal-toothed axial passage 20 in shaft 5, so that the drive connection with the axially movable shaft 5 is completed.

A known method of stabilising the running of single phase synchronous motors and ensuring their reliable starting is to couple a disc-shaped damping mass by means of a friction fit to the driven element of such motors. The mass is arranged so as to be freely rotatable and axially movable in relation to the driven element and is pressed by the application of a force against a friction plate which rotates with the driven element. When the motor is started or if load fluctuations occur the damping mass tends to have a constant speed compared to the friction plate, against which it engages in stable running and rotates synchronously with the driven element. The frictional load occurring when the damping mass rotates smoothly results in known fashion in a stabilizing effect, an improvement of the power output of the motor being simultaneously possible.

To generate the force needed to press the damping mass against the friction plate which is rotating with the driven element, the design is such that the damping mass, consisting at least partially of magnetizable material, is located within range of a stray magnetic field while the friction plate is located between the rotor of the motor and the damping mass. The magnetic force acting on the damping mass as a result of the stray magnetic field then causes the damping mass to be pressed against the friction plate since it attracts the damping mass to the friction plate.

In this embodiment the disc-shaped damping mass 21, consisting of iron, is mounted on shaft 5 so as to be freely rotatable and axially movable on the shaft and the friction plate rotating with the driven element is formed by a disc 22 which is force-fitted on shaft 5 between the rotor 14 of the motor and the damping mass. The position of the damping mass 21 on shaft 5 is chosen so that the damping mass 21 is located within range of the stray magnetic field of the electrical excitation of the motor. The magnetic lines of force of the electrical excitation of the motor are indicated by broken lines 23 in FIG. 2. This stray magnetic field of the electrical excitation of the motor is created as soon as the exciting windings 13 of the motor are connected to the supply voltage, whereupon a main magnetic field is formed which is closed via the two stator limbs and the rotor 14 of the motor. At the same time the stray magnetic field closes round the outside of the stator limbs. In doing so, this stray field penetrates the damping mass 21 consisting of magnetizable material, and the latter is attracted to and pressed against friction plate 22. Thus, when the motor is connected to its supply voltage, the damping mass 21 comes into operation, enabling it to perform its damping and stabilising function. After the motor has been disconnected from the supply voltage, the damping mass 21 is again free to rotate round and move axially along shaft 5.

As can be seen, no additional measures are therefore necessary in order to press the damping mass 21 against the friction plate 22 rotating with the driven element since pressing is effected directly by the magnetic force generated by the stray magnetic field of the motor, so that a particularly simple construction and also a particularly simple assembly are achieved.

Figure 3:
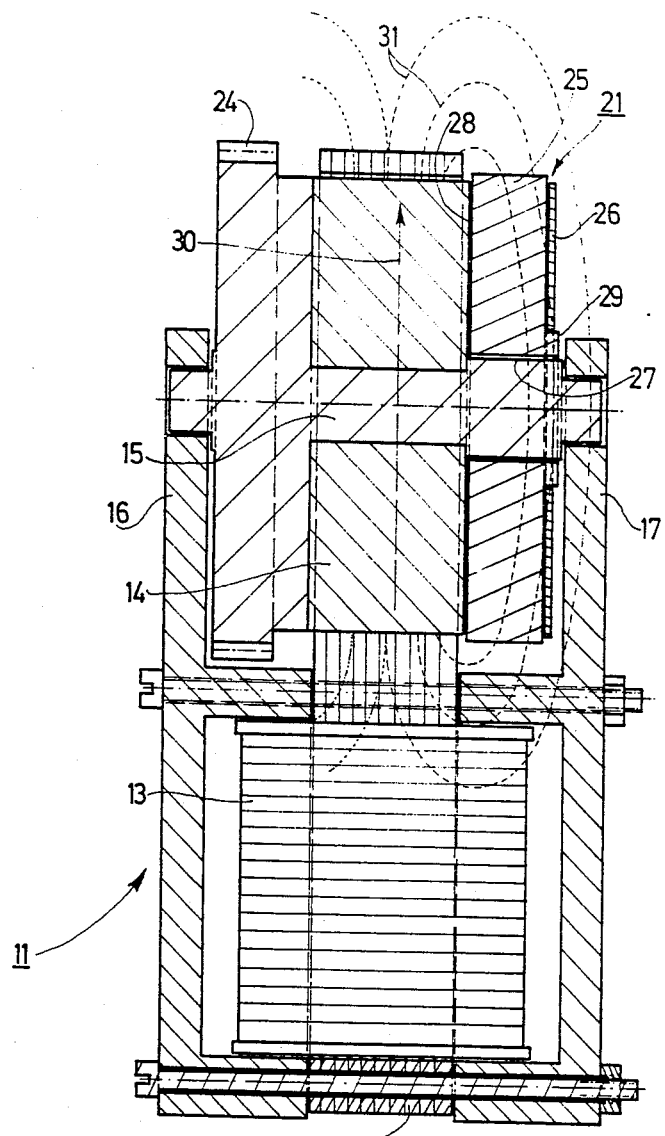
FIG. 3 is an electric motor with a permanent magnet rotor in which a damping mass is located within the area of the stray magnetic field of the rotor.

FIG. 3 shows separately a self-starting single-phase synchronous motor 11 such as can be used, for example, to drive an electric shaver. Fitted to the carrier 15 for the cylindrical rotor 14 is a gearwheel 24 which forms part of the driven element of the motor. The damping mass 21 in this embodiment is formed by two discs 25 and 26 located side by side. Of these discs 25 is freely rotatable and axially movable on a shaft section 27 of the carrier 15 located alongside rotor 14, where it is in direct contact with a side surface of rotor 14, which surface acts here as a friction plate rotating with the driven element. The second disc is also freely rotatable and axially movable on a cylindrical collar fitted on the side of disc 25 away from the rotor 14 so that disc 26 is not attached to shaft section 27 or driven element and therefore does not cause any friction losses in relation to shaft section 27 or the driven element. In principle, however, it would also be possible to mount disc 26 on shaft section 27 itself. In that case the first disc 25 consists of non-magnetizable material whereas the other, second disc consists of magnetizable material. The first disc 25 then predominantly forms the damping mass on its own. The other, second disc 26 is made essentially thinner than disc 25, namely by at least a factor of 10, and is used to provide the force needed to press disc 25 against the side surface 8 of rotor 14. This two-part design of damping mass 21 as discs 25 and 26 means that a heavier material such as brass, for example, which is not magnetizable, can be used for disc 25, whereas the magnetizable disc 26 can consist of iron. A particularly favorable dimensioning of damping mass 21 as a whole is thus possible.

In this embodiment the damping mass 21 is located within range of the stray magnetic field of rotor 14, which consists of a diametrically magnetized permanent magnet, whose direction of magnetization is indicated by the arrow 30. The stray magnetic field of rotor 14 closes round the rotor as indicated by the broken lines 31 in FIG. 3. This stray magnetic field of the permanent magnet rotor 14 constanty attracts the second disc 21, consisting of magnetizable material, in the direction of side surface 28 of the rotor so that disc 25, located between them, is constantly pressed against side surface 28, which rotates with the driven element. The damping mass 21 can thus again exert a damping and stabilizing effect on the running of the rotor.

The fact that in this embodiment the damping mass 21 is immediately adjacent to a side surface of rotor 14 means that a very compact construction is obtained. In principle, it would also, of course, be possible, as in the example of embodiment shown in FIGS. 1 and 2, to provide a separate friction plate for damping mass 21.

It should also be mentioned that the second disc 26 need not necessarily be freely rotatable and axially movable but might also be permanently attached to disc 25, e.g. with adhesive. In this embodiment as in the embodiment shown in FIGS. 1 and 2, a single disc consisting of magnetizable material could obviously also be used as the damping mass. The insertion, here, however, of the non-magnetizable disc 25 between the rotor 14 and the magnetizable disc 26 yields the further advantage that disc 25 creates a certain distance between disc 26 and rotor 14, so that the magnetic shunt formed by disc 26 in relation to the permanent-magnet rotor 14 is smaller. Another possibility would be to insert parts consisting of magnetizable material in a disc consisting of non-magnetizable material, which parts would then, in response to the stray magnetic field of the motor, perform the function of pressing the disc against the friction plate rotating with the driven element.

It has also proved very effective for the facing sides of the friction plate and the damping mass to be treated with a lubricant so that the frictional relation between these is influenced in the sense that the slipping of the damping mass is promoted. The most widely differing greases or oils which are generally available commercially can be used as lubricants here, e.g. "Alania Grease R2" or "Precision Fluid 78".

As can be seen, a series of variations on the embodiments described above are therefore possible without exceeding the framework of the invention. That is particularly the case with regard to the design and arrangement of the damping mass as such, and also its interaction with the friction plate rotating with the driven element, against which friction plate it is pressed under the influence of a stray magnetic field. Needless to say, the measures according to the invention can be employed in connection not only with a self-stabilization of their running or an improvement of their starting behavior by synchronous motors per se, but, e.g. also in so-called stepping motors.

What is claimed is:

1. A synchronous electric motor having a frictionally coupled damping device, comprising a frame; a stator winding adapted for connection to a source of alternating current, producing in normal operation an alternating magnetic field; a rotor including a shaft mounted to said frame for rotation about a shaft axis, arranged to be driven about said axis by cooperation with said magnetic field; a friction plate mounted to said rotor for rotation therewith; a disc-shaped damping mass arranged to be freely rotatable about and axially movable along said axis; and means for pressing said damping mass against said friction plate through the action of a magnetic force,
   characterized in that said rotor comprises a diametrically magnetized permanent magnet arranged for said cooperation with said field to drive the motor, said permanent magnet producing a stray magnetic field, and
   said means for pressing comprises a disc of magnetizable material mounted for rotation about said shaft, said friction plate being disposed between said disc and said permanent magnet, said disc being located within said stray magnetic field such that attraction of said disc by said stray magnetic field presses said damping mass against said friction plate.

2. A motor as claimed in claim 1, characterized in that said rotor is a cylindrical rotor, having a side surface, said rotor side surface forming said friction plate.

3. A motor as claimed in claim 2, characterized in that said damping mass is formed by two discs located side by side, a first of said discs being made of a non-magnetizable material and being disposed between said friction plate and the second of said discs.

4. A motor as claimed in claim 3, characterized in that said first of said discs has a thickness in the axial direction at least ten times the thickness of said second of said discs.

5. A motor as claimed in claim 4, characterized in that said friction plate and said damping mass have facing side surfaces, and said motor comprises lubricant with which said facing side surfacs are treated.

6. A synchronous electric motor having a frictionally coupled damping device, comprising a frame; a stator winding adapted for connection to a source of alternating current, producing in normal operation an alternating magnetic field; a rotor including a shaft mounted to said frame for rotation about a shaft axis, arranged to be driven about said axis by cooperation with said magnetic field; a friction plate mounted to said rotor for rotation therewith; a disc-shaped damping mass arranged to be freely rotatable about and axially movable along said axis; and means for pressing said damping mass against said friction plate through the action of a magnetic force,
   characterized in that said alternating magnetic field includes a stray alternating magnetic field, and
   said damping mass comprises a magnetic material disposed within said stray magnetic field, arranged such that said means for pressing is a magnetic coupling between said magnetic material and said stray magnetic field.

7. A motor as claimed in claim 6, characterized by comprising a rotating element axially slidably coupled to said shaft for rotation therewith, said friction plate being fixed to said element and said damping mass being slidably mounted on said element for rotation therewith.

8. A motor as claimed in claim 7, characterized in that said friction plate and said damping mass have facing side surfaces, and said motor comprises lubricant with which said facing side surfaces are treated.

* * * * *